No. 755,177. PATENTED MAR. 22, 1904.
W. S. SHARPNECK.
ROLLER BEARING.
APPLICATION FILED DEC. 30, 1902.
NO MODEL.
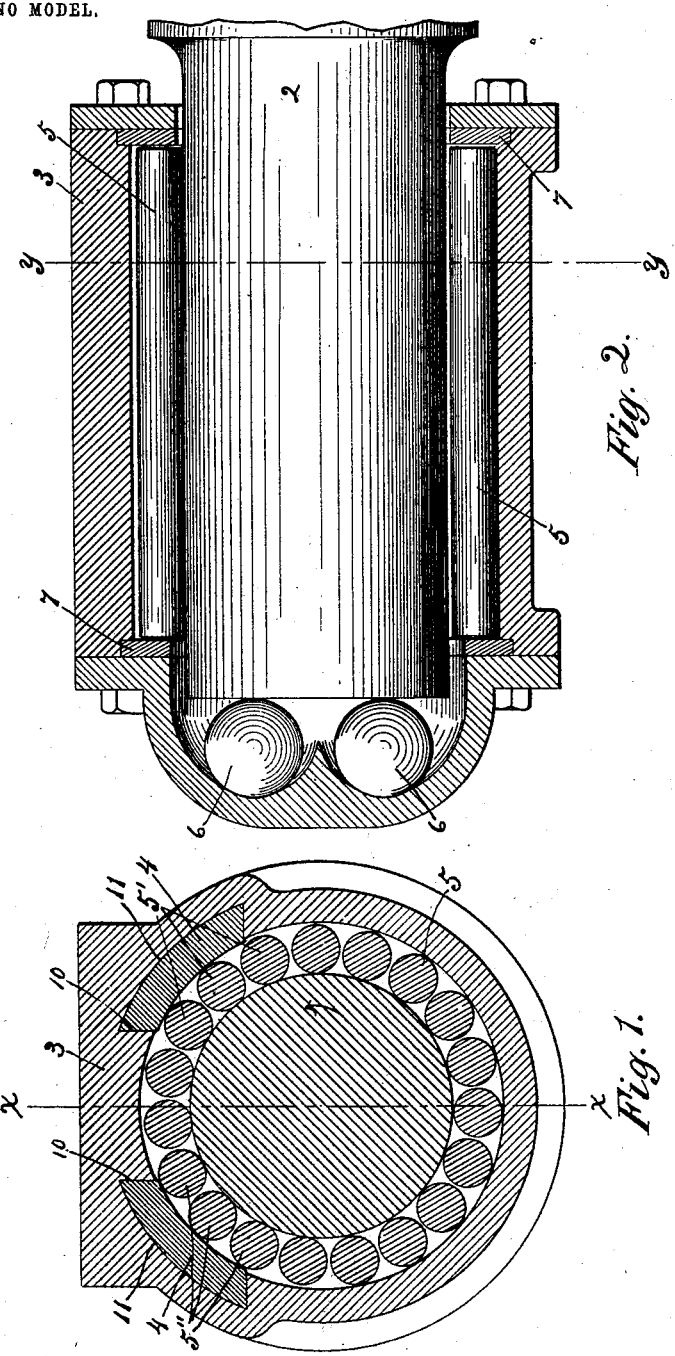
WITNESSES:
INVENTOR.
William S. Sharpneck,
BY
Fred H. Bowersock
ATTORNEY No. 755,177. Patented March 22, 1904.

UNITED STATES PATENT OFFICE.

WILLIAM S. SHARPNECK, OF CHICAGO, ILLINOIS, ASSIGNOR OF TWO-THIRDS TO JAMES L. ONSTOTT AND FREDERICK C. VEHMEYER, OF CHICAGO, ILLINOIS.

ROLLER-BEARING.

SPECIFICATION forming part of Letters Patent No. 755,177, dated March 22, 1904.

Application filed December 30, 1902. Serial No. 137,128. (No model.)

*To all whom it may concern:*

Be it known that I, WILLIAM S. SHARPNECK, a citizen of the United States, residing at Chicago, Cook county, Illinois, have invented certain new and useful Improvements in Roller-Bearings, of which the following is a specification.

This invention relates to antifriction roller and ball bearings, and has particular reference to roller-bearings for heavy vehicles or for vehicles upon which heavy loads are imposed, such as railroad-cars and the like.

One of the well-known objections to roller and ball bearings has been the friction between the rollers and balls on account of their adjacent surfaces rotating against each other in opposite directions and the weight of the load being imposed upon substantially one-half of the rollers or balls in such a way as to cause considerable crowding and binding between them.

The object of my invention is to reduce friction between the rollers or balls, to reduce the number thereof upon which the load is imposed at one time, and to do away with binding between the rollers or balls not actually under load.

A further object of the invention is to provide a removable wearing-surface which may be renewed at comparatively small cost of material and labor.

A still further object of the invention is to provide a removable wearing-surface which shall permit of a construction in which a friction-surface of better wearing qualities and of better material than the balance of the box or ball-race, thereby avoiding the necessity of constructing the whole of the latter of the more expensive material.

Generally speaking, my invention consists in one or more friction members adapted to be inserted in a bearing-box or ball-race in such a manner as to project slightly beyond the inner surface of said box or ball-race wearing-surface, whereby smaller and removable friction-surfaces are provided; and the invention further consists in the various details of construction and in combinations of parts, all as hereinafter more fully described, and particularly pointed out in the claims.

My invention will be more readily understood by reference to the accompanying drawings, forming a part of this specification, and in which—

Figure 1 illustrates my invention as applied to a car-axle, being a transverse section through the journal, journal-box, and a pair of gibs or roller-bearings, together with a set of rollers. Fig. 2 is a longitudinal sectional view of the same.

In the drawings, 2 represents the car-axle; 3, the journal-box; 4 4, the gibs or bearing members dovetailed into the inner surface of the box 3.

5 represents the bearing-rollers proper, and 6 6 the balls between the end of the journal and the outer end of the journal-box, which reduce friction therebetween and prevent longitudinal movement of the journal with relation to its bearings.

Referring particularly to Fig. 1, it will be noted that the gibs or bearing members 4 4 have beveled edges 10 and the box 3 is provided with recesses 11, which contain the gibs or bearing members 4 or interlock said members and the box against any but longitudinal movement with relation to each other. Interposed between the ends of the box 3 and the ends of rollers 5 are ring-formed washers 7, which may be secured to the box in any suitable manner, and said washers provide stops and wearing-surfaces for the ends of the rollers 5.

In operation the gibs or bearing members 4 rest upon only a portion of the balls or rollers. A sufficient number of rollers is provided to insure there being at least one roller or ball between the journal and bearing at all times. Assuming that the axle rotates to the left, the movement of the axle or journal will roll the balls 5' and 5" to the left under the respective gibs, and these balls will alone sustain the weight, leaving the other balls comparatively free. As one ball rotates from under a gib 4 another one takes its place from the right, and a free ball or roller enters between the journal and gib. As there is always a roller or ball separating the bearing from the journal, a loose roller or ball can always roll into bearing position without appreciable resistance; but to further insure smooth movement the edges of the gibs 4 are beveled, as shown, to provide an incline for the roller or ball in its approach to its bearing position, which incline facilitates rotation, especially in case of slight discrepancies between the diameters of the respective rollers or balls. As only the balls 5' 5" are under restraint or under load, the other rollers or balls are comparatively free from the load and the friction between them is correspondingly reduced. In the arrangement shown only from four to six balls are in a position to bind, making at the most four contact-surfaces out of a total of 19 which are subject to the usual grinding of rollers in bearings. The area of friction-surface of the gibs 4 may of course be varied in proportion to the amount of load to be imposed upon the rollers. A single gib 4 would be sufficient for light work, and same could be so narrow that but two balls would sustain the load at any one time. I prefer, however, the arrangement shown for railroad-coaches and box-cars, where the weight imposed upon the bearing is considerable. It is obvious that it is not absolutely necessary to bevel the edges of the gibs 4, as the mounting thereof upon a free roller or ball on an incline plane is largely theoretical, it being assumed that the cross-section of all the rollers or balls is the same. The additional diameter of box made necessary by the projection of the gibs 4 beyond the inner surface thereof provides ample room for the free rollers and also contributes to the prevention of binding between said free rollers.

It is obvious that a plurality of ball-races may be provided for the journal and box instead of the rollers, that the rollers may be of any suitable length with relation to the box, and that numerous other modifications may be made in my device by one skilled in the art to which it appertains without departing from the spirit of my invention, which I therefore do not confine to the specific construction herein shown and described.

Having thus described my invention, I claim as new and desire to secure by Letters Patent—

1. The combination, with a journal, a series of rollers and a roller-box supporting said rollers around said journal, of segmental bearing members projecting from the upper surface of the box, said bearing members being adapted to support the entire load successively upon a minority number of said rollers.

2. The combination, with a journal, a series of rollers concentric therewith and a box supporting said rollers, of a pair of individual segmental bearing members rigidly held in and projecting from the bearing-surface of the box, said bearing members having their projecting edges beveled at an acute angle with relation to the surface of the journal and sustaining all of the load of the vehicle upon the rollers in contact with such bearing members.

3. The combination, with a journal, an annular series of rollers substantially concentric with said journal, a roller-bearing box adapted to sustain the lower of said rollers, of a pair of separate bearing members presenting segmental bearing-surfaces in the upper portion of said box, each adapted to sustain successively a limited plurality out of the total number of rollers in said series and sustain all of the load upon said rollers.

In testimony whereof I have hereunto set my hand in the presence of two subscribing witnesses.

WILLIAM S. SHARPNECK.

Witnesses:
J. W. BECKSTROM,
F. E. STEWART.